United States Patent [19]

Slemmons et al.

[11] Patent Number: 4,515,151

[45] Date of Patent: May 7, 1985

[54] FIBER-REINFORCED CONCRETE SOLAR COLLECTOR

[75] Inventors: Arthur J. Slemmons, Los Gatos; Peter J. Newgard, Redwood City, both of Calif.

[73] Assignee: SRI International, Menlo Park, Calif.

[21] Appl. No.: 404,272

[22] Filed: Sep. 27, 1982

[51] Int. Cl.³ .............................................. F24J 3/02
[52] U.S. Cl. ................................... 126/450; 126/445; 126/448; 126/417
[58] Field of Search .............. 126/444, 445, 450, 442, 126/448, 417

[56] References Cited

U.S. PATENT DOCUMENTS

| | | | |
|---|---|---|---|
| 3,399,664 | 9/1968 | Suhay | 126/444 |
| 4,056,092 | 11/1977 | Meier et al. | 126/450 |
| 4,114,599 | 9/1978 | Stephens | 126/445 |
| 4,243,021 | 1/1981 | Homsy et al. | 126/449 |
| 4,257,481 | 3/1981 | Dobson | 126/448 X |
| 4,282,856 | 8/1981 | Stehl et al. | 126/450 X |
| 4,300,539 | 11/1981 | Dobson | 126/450 X |

*Primary Examiner*—Larry Jones
*Attorney, Agent, or Firm*—John P. Taylor

[57] ABSTRACT

A solar collector is disclosed comprising a glass member having a solar selective coating thereon, and a molded, glass-reinforced concrete member bonded to the glass member and shaped to provide a series of passageways between the glass member and the fiber-reinforced concrete member capable of carrying heat exchanging fluid therethrough. The fiber-reinforced concrete member may be formed by spraying a thin layer of concrete and chopped fibers such as chopped glass fibers onto a mold to provide an inexpensive and lightweight, thin-walled member. The fiber-reinforced concrete member may have a lightweight cellular concrete backing thereon for insulation purposes. The collector is further characterized by the use of materials which have substantially matching thermal coefficients of expansion over the temperature range normally encountered in the use of solar collectors.

12 Claims, 3 Drawing Figures

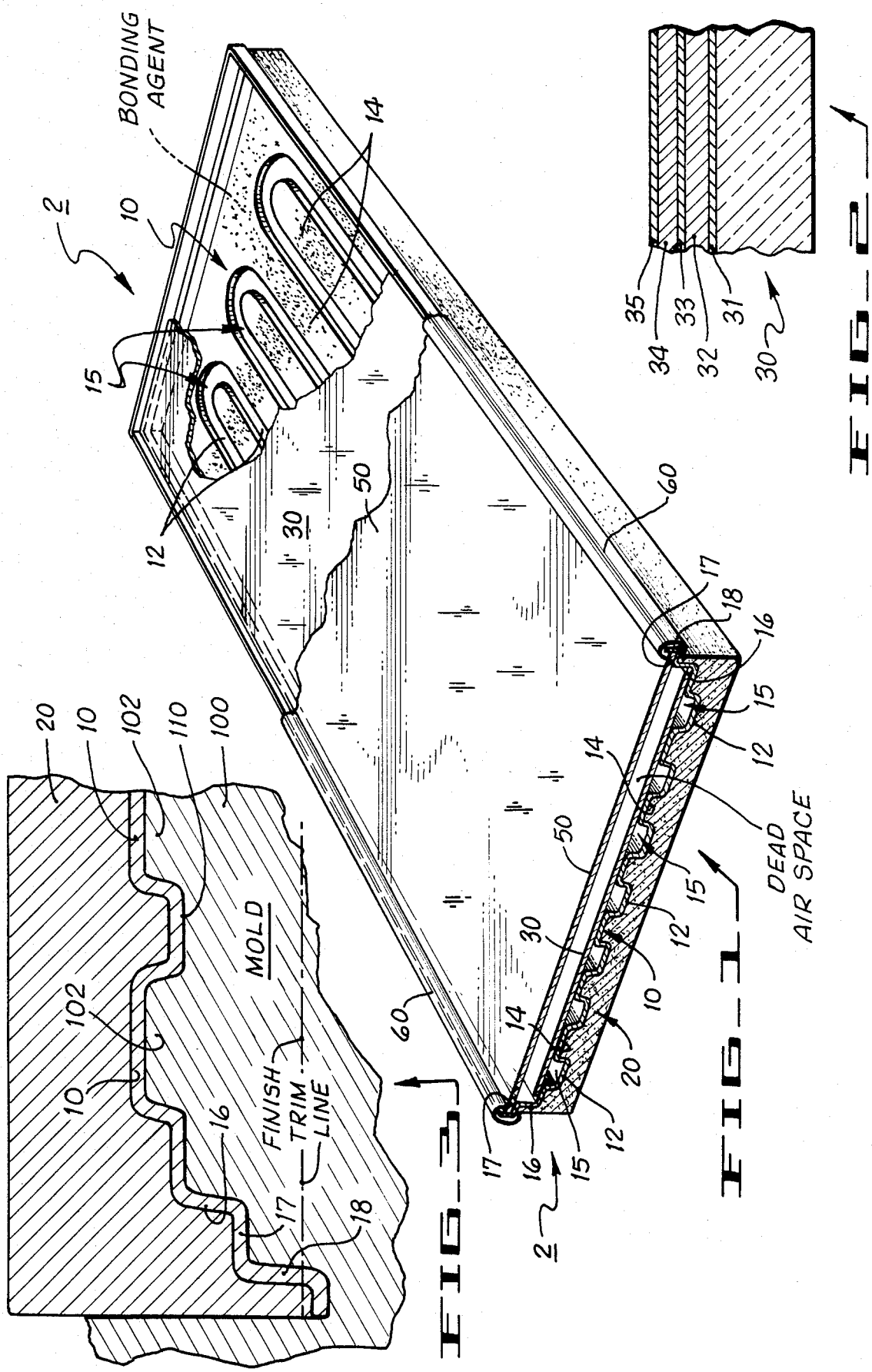

FIBER-REINFORCED CONCRETE SOLAR COLLECTOR

BACKGROUND OF THE INVENTION

This invention relates to solar collectors. More particularly, this invention relates to solar collectors made using fiber-reinforced concrete.

Steep increases in the cost of conventional forms of energy based largely on the increases in the cost of fuels to provide such conventional energy have focused attention upon the need for developing solar energy sources. The environmental effects of the use of fossil fuels to provide energy has provided further impetus toward the development of such solar energy alternatives. The efficient and economic collection of solar radiation should be the preferred means for heating and cooling of buildings, domestic hot water heating, and industrial process heat.

However, while much research has been conducted on the feasibility of the use of flat-plate solar collectors including the physics of high absorption and low emissivity surfaces, the successful commercialization of solar thermal energy largely depends upon developing a system that provides energy at a cost low enough to be competitive with energy from conventional fuels. This requires more than the development of highly selective surfaces capable of providing sufficient heat absorption over an average period of sunny and cloudy days. The economic viability of such a system requires that the solar collecting panels be relatively inexpensive, lightweight, and durable in construction. Among the characteristics of durability must be both strength and matching of thermal coefficients of expansion over the wide range of temperatures which are normally experienced in the collection of solar energy. The absence of such strength and thermal matching will otherwise result in a panel with a short life; a situation which will more than counter any positive effects from the use of low cost materials.

It is known to construct solar collectors using concrete materials. Alosi U.S. Pat. No. 4,164,933 describes a precast concrete solar panel with a pasageway within the concrete serving as a conduit for conveying a fluid to effect a heat transfer intermediate the proximate planar surface of the panel. While such a panel would provide durability, it would not be lightweight. Furthermore, heat transfer through the concrete from the passageway to the surface would be inefficient.

SUMMARY OF THE INVENTION

It is, therefore, an object of the invention to provide a solar collector characterized by a low cost, lightweight, efficient, and durable construction. It is another object of the invention to provide a solar collector which utilizes materials having substantially matching thermal coefficients of expansion. It is yet another object of the invention to provide a lightweight, solar collector made using fiber-reinforced concrete. These and other objects of the invention will become apparent in the study of the description of the invention and drawings which follows.

BRIEF DESCRIPTION OF THE DRAWINGS

FIG. 1 is a partially cutaway isometric view of the solar collector.

FIG. 2 is a cross-sectional view illustrating the construction of the solar collector.

FIG. 3 is a fragmentary cross-sectional view of the selective coating.

DESCRIPTION OF THE INVENTION

Turning now to FIG. 1, the solar collector of the invention is generally shown at 2. Solar collector 2 comprises a shaped panel 10 of glass-reinforced concrete to which, in the preferred embodiment, is bonded, on one side, a layer of lightweight cellular concrete insulation 20. As will be described in more detail with respect to FIG. 2, concrete panel 10 is conveniently formed by the application of the uncured concrete together with chopped fiber to a mold. The lightweight cellular concrete insulation is then, in turn, applied to the exposed side of the concrete panel. Panel 10 is formed as a corrugated panel having channels 12 and flat, raised lands 14. After curing of concrete panel 10, a glass sheet 30 is bonded to flat lands 14 on panel 10 thereby cooperating with grooves 12 to define a passageway 15 between panel 10 and glass sheet 30.

Glass sheet 30 is bonded to panel 10 with an appropriate bonding agent, such as, for example, a cement bonding agent, such as Saureisin cement bond or an epoxy resin, such as Aquatapoxy, an epoxy adhesive available from the American Chemical Company, 81 Ecina Avenue, Palo Alto, CA 94301. The bonding agent is applied to flat lands 14 on panel 10 and glass plate 30 is then firmly pressed against the flat, coated lands.

The exposed surface of glass plate 30 is coated with a solar selective coating which will maximize the absorption of the solar specturm while minimizing the emissivity of radiation back to the atmosphere. While a number of different coating materials are known which may be applied to glass surfaces to provide a solar selective coating, a preferred coating composite is shown is FIG. 2 which comprises a first layer 31 of silicon nitride which is applied directly to the surface of glass plate 30. A layer 32 of molybdenum metal is applied to the silicon nitride layer 31 as a reflector. A chromium oxide barrier layer 33 is then applied to the molybdenum layer 32. A layer 34 of amorphous silicon metal is then applied as an absorbing layer. Finally, a second layer 35 of silicon nitride is applied as an anti-reflecting layer. Other coatings applied as paints are commercially available.

Referring again to FIG. 1, concrete panel 20 is provided with a raised peripheral lip defining a first section 16 substantially at right angles to flat lands 14, a second shoulder portion 17, and a third upright portion 18. A protective glass layer or plate 50 is mounted on shoulder 17 of panel 10 using an appropriate gasket-like sealant, such as, for example, a silicone rubber sealant. Glass layer 50, which may be constructed of tempered glass if necessary for strength puposes, acts as a protective member over the coated surface of glass plate 30. Furthermore, the volume defined by glass plate 30, glass plate 50, and the upright portion 16 of panel 10 provide an insulating, dead air space which, while permitting easy passage of radiation therethrough, provides a conductive heat barrier to preserve the heat from the absorbed radiation on the selective coating on glass plate 30.

In the illustrated embodiment, a rolled steel clip 60 engages the underside of shoulder 17 on panel 10 and the peripheral edge of the upper surface of glass plate 50 to thereby securely hold glass plate 50 to solar collector assembly 2 in a manner which would permit easy removal and replacement should plate 50 be subsequently damaged during usage.

Referring now more specifically to FIG. 3, panel 10 is formed by applying a thin layer of cement to a mold 100. In the preferred embodiment the concrete, together with the reinforced fibers, are applied to the mold by a gun such as that used in the forming, in situ, of concrete swimming pools. Mold 100 is a male mold provided with raised portions 102 which will correspond to the corrugated channels 12 to be formed in panel 10. The flat bottomed depressed areas 110 form the raised flat lands 14 of panel 10.

The concrete used to form panel 10 is a portland cement, such as ASTM Type I or Type II. Preferably the portland cement is a low alkaline type. The concrete is reinforced with a chopped fiber capable of withstanding alkaline attack from the concrete. In a preferred embodiment the fibers are glass fibers made from zirconia sands, such as commercially available under the trademark "Cem-FIL AR". Preferably, the glass fibers are chopped to a length of about 1 to 1½" simultaneously with the application of the concrete to the mold. This is done using conventional equipment designed to chop the glass fibers and mix them with the concrete in a gun used to apply the mixture to the mold. Preferably, the resultant glass fiber reinforced concrete is then aplied to the mold in a layer of about 3/16" thickness.

Following application of the glass-reinforced concrete to mold 100, mold 100 is still face down (with the glass-reinforced concrete facing upward) on a horizontal surface and side mold pieces 120 are positioned around the periphery of mold 100. In the preferred embodiment, a layer of lightweight cellular concrete 20 is then poured over the glass-reinforced concrete to an average depth of approximately 2 inches to provide insulation to the back side of the panel. The glass-reinforced concrete and the lightweight cellular concrete applied thereon are then both allowed to cure together to form a tightly bonded stucture.

The lightweight cellular concrete preferably is a lightweight concrete formed using a foaming agent to produce a cellular concrete. In the preferred embodiment, a biodegradable foaming agent is used comprising a hydrolyzed protein, such as commercially available under the trademark Neopor from Neopor Verfahrenstecnik Gmbh. The foaming agent is mixed with water in a ratio of 40 parts water per part foaming agent and mixed together to form an emulsion which is emitted under pressure as a foam having a consistency like that of shaving cream. The foam emulsion is then mixed with sand, portland cement, and water. The ratios may vary considerably depending upon the desired strength. For a lightweight material high in insulation value and having a density of about 38 pounds per cubic foot, 354 pounds sand, 523 pounds portland cement, and 185 pounds water are mixed with 2.34 gallons of foam.

The use of other lightweight concretes having either foaming agents or lightweight aggregate are within the contemplation of the invention and are intended to be embraced by the term "lightweight cellular concrete" as used herein.

After the lightweight cellular concrete and glass-reinforced molded concrete have cured, the mold is removed and the bonding agent for the glass panel is applied to the flat land portions of the glass-reinforced concrete. The coated glass panel 30 is then pressed firmly to place and the bonding material allowed to cure.

In the embodiment illustrated in FIG. 1, a long serpentine channel 15 is formed by glass-reinforced concrete panel 10 and glass layer 30 thereon. It will, of course, be recognized that variously shaped passageways can be formed. It is preferred, however, that the passageways be shallow and wide to provide the maximum surface areas in contact with the glass layer having the selective coating thereon to permit maximum heat transfer from the radiation absorbed in the glass to the liquid flowing through the passageways. In accordance with the invention, panel 10 may be molded to provide manifolds at opposite ends of the collector with generally parallel passageways interconnecting the opposite manifolds to provide parallel flow of liquid from one manifold to the other. Alternatively, the passageways may be formed as a continuous serpentine passage with one entrance and one exit.

In either embodiment, however, it should be noted that the invention is characterized by the use of materials having substantially identical thermal coefficients of expansion. That is, the concrete cast panel, the fiber reinforcements therein, the foamed concrete insulation bonded thereto, the glass having the solar selective coating thereon and the protective glass layer all have substantially the same coefficients of expansion thus permitting usage of the panel throughout the range of temperatures which may be found in a solar collector which may range from as low as freezing temperatures (in the winter time at night) to as high as the boiling point of the liquid used which may be as high as 200° C. Furthermore, certain portions of the panel may substantially exceed this temperature rising as high as 300° C. While the panel illustrated in FIG. 1 does contain a steel clip to retain the upper protective glass layer, it will be readily apparent that the nature of this type of construction using a yieldable spring steel clip 60 permits a thermal mismatch of this one component without departing from the desired goal of a composite panel with no thermal mismatch. In other words the use of spring clip 60 does not result in leakage, or rupturing of bonds between the components which would otherwise shorten the life of the panel and thus defeat one of the goals of the invention which is to provide a low cost, yet durable, solar collector. It should be noted in this regard that the spring clip could be replaced if desired by a bonding material similar to that used to retain glass plate 30 to panel 10.

Having thus described the invention with respect to its preferred embodiments,

What is claimed is:

1. A solar collector comprising a glass member having a solar selective coating on a first surface thereon characterized by high absorption and low emissivity, a shaped concrete member secured to said glass member, said concrete member comprising thin-wall concrete reinforced with alkali-resistant fibers and shaped to provide, in co-operation with said glass member secured thereto, a series of passageways capable of carrying heat exchanging fluid therethrough to a heat exchanger, said solar collector being further characterized by the use of materials having substantially matching thermal expansion coefficients over the temperature range to which solar collectors are normally exposed.

2. The collector of claim 1 wherein said alkali-resistant fibers comprise alkali-resistant glass fibers.

3. The collector of claim 2 wherein said alkali-resistant glass fibers are made from a zirconia glass.

4. The collector of claim 2 wherein said alkali-resistant glass fibers are chopped to a length of about 1 and ½ inches.

5. The collector of claim 4 wherein said shaped concrete member reinforced with chopped alkali-resistant glass fibers is formed by spraying the concrete and fibers onto a mold.

6. The collector of claim 5 wherein said fibers are chopped during the spraying operation.

7. The collector of claim 1 wherein said shaped concrete member has a layer of lightweight cellular concrete attached thereto on an opposite side from said glass member to provide insulation for the fluid flowing through said passageways.

8. The collector of claim 7 wherein said concrete layer and said glass member are bonded together using a bonding agent.

9. The collector of claim 8 wherein said bonding agent comprises a cement bonding agent.

10. The collector of claim 8 wherein said bonding agent comprises an epoxy resin.

11. The collector of claim 1 wherein a transparent protective cover is mounted to the collector over said glass member to reduce convection losses.

12. A solar collector characterized by construction from materials having matching thermal expansion coefficients over a temperature range of from 0° to 200° C. and comprising a thin wall concrete member reinforced with alkali-resistant fibers and having a first surface shaped to provide, in cooperation with a glass cover member sealed thereto, a series of passageways capable of carrying a heat exchange fluid; a solar selective coating on one surface of said glass cover member characterized by high absorption and low emissivity; a transparent protective cover mounted over said glass cover member to protect said glass cover member and the coating thereon; and a layer of concrete foam insulation applied to the opposite surface of said thin wall concrete member; said thin wall reinforced concrete, said alkali resistant fibers, said glass cover member, said transparent protective cover, and said foam concrete insulation having matching thermal expansion characteristics over a temperature range of from 0° to 200° C.

* * * * *